UNITED STATES PATENT OFFICE.

LEO WEBER, OF DARMSTADT, GERMANY.

PYRIMIDIN DERIVATIVE.

No. 848,791.　　Specification of Letters Patent.　　Patented April 2, 1907.

Application filed September 8, 1904. Serial No. 223,746. (Specimens.)

*To all whom it may concern:*

Be it known that I, LEO WEBER, doctor of philosophy, and a subject of the Grand Duke of Baden, in the Empire of Germany, residing at Darmstadt, Germany, have invented certain new and useful Improvements in the Manufacture of Pyrimidin Derivatives, of which the following is a specification.

This invention consists in the new pyrimidin derivatives of the oxypyrimidin type, characterized by having probably the following general formula:

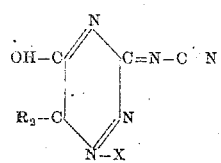

in which R represents a hydrogen atom which may be replaced by an alkyl radical, and X either a methyl, hydroxyl, or amido group. On prolonged boiling this new class of bodies is decomposed into 2-oxypyrimidin derivatives, carbonic and ammonia.

This invention also consists in the condensation of dicyandiamid with a negatively-substituted acetic acid of the following general formula:

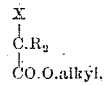

in which $R_2$ represents hydrogen atoms which may be replaced by alkyl radicals, and X represents either the cyan group, the radical of acetic acid, or the radical characteristic of malonic acid ester, such condensation being effected in a solution of sodium ethylate or potassium ethylate, as more particularly hereinafter described.

Generally under the term "negatively sub-acetic-acid ester" a class of derivatives of acetic-acid ester is understood in which X, as above, represents negative groups, such as the cyan group, (CN,) the carboxyl group, (COOH,) the esterified carboxyl group, (COO-alkyl,) or the acidyl group, ($CH_3CO$-.)

The following is an example of one mode of procedure for the obtainment of such a product: 5.5 kilograms of metallic sodium are dissolved in absolute alcohol, and to this solution are added at first 13.4 kilograms of cyanacetic-acid ester, and then ten kilograms of dicyandiamid dissolved in absolute alcohol. The whole is kept boiling for three hours in connection with a reflux condenser. The sodium salt of the pyrimidin derivative is thereby precipitated for the most part in a crystalline condition. The crystals are filtered off, the filtrate is evaporated to dryness, the residue is united with the filtered-off crystal mass, and the whole is dissolved in water. The solution is acidified with acetic acid, (14.4 kilograms glacial acetic acid,) and thus the 2-cyanimino-4-amino-6-oxypyrimidin is precipitated in colorless crystals.

The course of the principal reaction in the foregoing example may be illustrated by this equation:

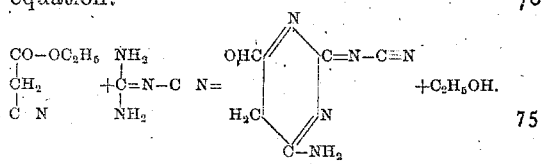

A second mode of procedure for the obtainment of a product belonging to the same class is the following: 4.9 kilograms of metallic sodium are dissolved in absolute alcohol, and to this solution are added at first 13.9 kilograms of acetoacetic-acid ester and afterward 9 kilograms of dicyandiamid dissolved in absolute alcohol. This mixture is kept boiling for four hours in connection with a reflux condenser. Then the sodium salt of the pyrimidin derivative, which has meanwhile partially precipitated, is filtered off, and the filtrate is evaporated to dryness. The residue is united with what has been filtered off and the whole is taken up in a little water. Upon acidifying with acetic acid (corresponding to 13.2 kilograms of glacial acetic acid) the 2-cyanimino-4-methyl-6-oxy-pyrimidin is precipitated out of the aqueous solution in colorless crystals.

The course of the principal reaction in this second example may be illustrated thus:

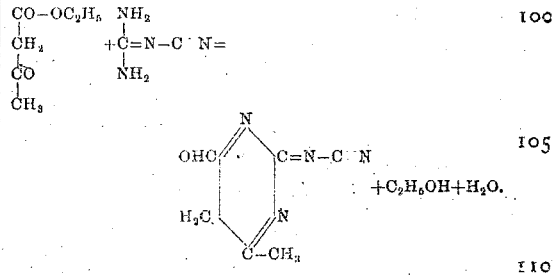

A third mode of procedure for the obtainment of a product belonging to the same class is as follows: 4.9 kilograms of metallic sodium are dissolved in absolute alcohol and to this solution are added 17.1 kilograms of malonic-acid ester and nine kilograms of dicyandiamid, which are dissolved in absolute alcohol. After two hours boiling of the mixture in connection with a reflux condenser the sodium salt of the pyrimidin derivative, which has precipitated partially solid, is filtered off, the filtrate is evaporated to dryness, and the residue is united with the filtered-off crystal mass. From the aqueous solution of the sodium salt there is obtained, upon acidifying with acetic acid, (13.2 kilograms of glacial acetic acid,) the free 2-cyanimino-4-6-dioxypyrimidin in colorless crystals.

The following equation may illustrate the course of the principal reaction in the third example just given:

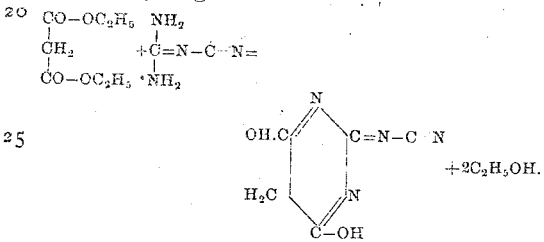

The condensation of dicyandiamid with either of the esters mentioned or their substitution products—such, for example, as diethyl-cyanacetic-acid ester, monomethyl-acetoacetic-acid ester, monoethylmalonic-acid ester, and the like—proceeds in a corresponding manner when one molecule of the dicyandiamid and one molecule of either ester are treated with two molecules of sodium ethylate or of potassium ethylate, as specified, and the condensation of dicyandiamid with diethylcyanacetic-acid ethyl ester will be further described as a mode of procedure. To a solution of twenty parts of potassium in five hundred parts of alcohol are added forty-two parts of finely-powdered dicyandiamid and eighty-five parts of diethyl-cyanacetic-acid ethyl ester. The mixture is heated for six hours on the boiling-water bath. After distilling off the alcohol the syrupy residue is dissolved in water and the new product is precipitated from its solution by acidifying with hydrochloric acid. The principal reaction and the constitution of the resulting product may theoretically be represented by the following equation:

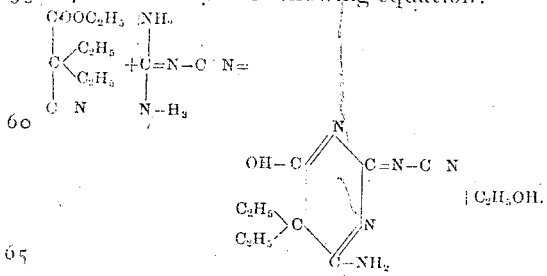

The product, 2-cyanimino-4-amino-5-diethyl-6-oxypyrimidin, crystallizes from boiling water in small needles which melt at 265° centigrade. It is nearly insoluble in cold water, but relatively easily soluble in a dilute solution of carbonate or of hydrate of soda, in warm alcohol, and in boiling water.

I claim as my invention—

1. The process of producing new derivatives of oxypyrimidin consisting in condensing dicyandiamid with negatively substituted acetic-acid esters in a solution of an alcoholate, boiling the liquid whereby the new derivative is formed, and isolating the same in the manner well known for this class of bodies, substantially as described.

2. The process of producing 2-cyanimino-4-amino-5-diethyl-6-oxypyrimidin consisting in condensing dicyandiamid with diethylcyanacetic-acid ester in a solution of sodium ethylate, boiling the liquid and isolating the precipitated crystalline mass by filtration, substantially as described.

3. The new derivatives of oxypyrimidin characterized by the following general formula:

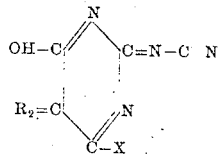

in which R represents hydrogen atoms which may be replaced by alkyl radicals and X a methyl, hydroxyl or amido group, produced by condensation of dicyandiamid and negatively substituted acetic-acid esters, and which new bodies are difficultly soluble in hot water and alcohol, readily soluble in alkaline liquids, forming salts with the alkalies and which are decomposed into 2-oxypyrimidin derivatives, carbonic acid and ammonia on prolonged boiling with dilute acids, substantially as described.

4. The new 2-cyanimino-4-amino-5-diethyl-6-oxypyrimidin produced by condensation of dicyandiamid and cyanacetic acid ester characterized by the formula:

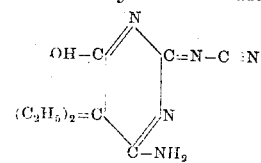

which is nearly insoluble in cold water, relatively easily soluble in a dilute solution of carbonate or of hydrate of soda, in warm alcohol and in boiling water, and crystallizes from the latter in small needles, which melt at 265° centigrade approximately.

5. As a new article of manufacture, a substance obtainable from oxypyrimidin and which on prolonged boiling with dilute hydrochloric acid is decomposed into 2-oxypyrimidin derivative, carbonic acid and ammonia and which is characterized by the following general formula:
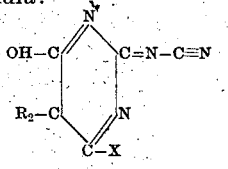
in which R represents hydrogen atom which may be replaced by alkyl radical and X a methyl, hydroxyl or amido group.
LEO WEBER.
Witnesses:
    CARL GRUND,
    LUDWIG MÜLLER.